United States Patent Office 3,494,271
Patented Feb. 10, 1970

3,494,271
LENS BARREL FOR CAMERA PROVIDED WITH GUIDE NUMBERS FOR FLASH PHOTOGRAPHY
Takeshi Muryoi, Yokohama-shi, Japan, assignor to Nippon Kogaku K.K., Tokyo, Japan, a corporation of Japan
Filed Aug. 25, 1967, Ser. No. 663,381
Claims priority, application Japan, Sept. 1, 1966, 41/82,647
Int. Cl. G03b 3/00
U.S. Cl. 95—44                           2 Claims

ABSTRACT OF THE DISCLOSURE

A lens mount for a camera in which adjustments are made for flash photography in the diaphragm openings in accordance with the distance of the object to be photographed. The lens mount includes the usual focusing or distance ring and a stop ring which may be interlocked by the mere expedient of shifting the stop ring longitudinally to engage clutch members provided on both of the rings. A flash guide number scale is provided on the stop ring while an indicator or pointer is provided on the distance ring, an optional distance value and stop value being combined to provide a flash guide number when the distance and stop rings are interlocked for flash photography. When the distance and stop rings are not interlocked, both rings may be independently rotated to provide for the usual type of photography.

---

Figure 1:
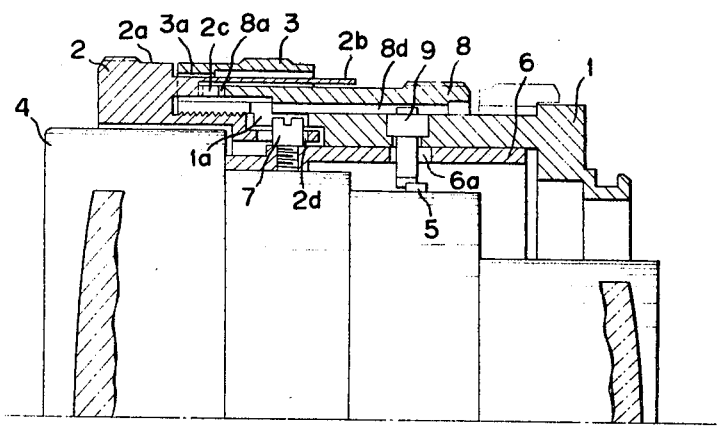

The present invention relates to an improvement of a camera lens which can automatically adjust the diaphragm in accordance with the distance to the object to be photographed when flash photography is used.

According to the present invention, a lens mount is provided for cameras which permits, an interlocking operation between distance to the object to be photographed and aperture stop, and when usual photography is desired, stopping ring and distance adjusting ring are separately utilized as in the usual cameras.

According to the present invention, the stopping ring is provided with a flash guide number scale so that when an optional distance value and stopping value are combined, a corresponding guide number is automatically indicated by an indicator arm. This is brought about by a clutch member formed on the distance adjusting ring and another clutch member formed on the stop ring engaging each other.

Figure 2:
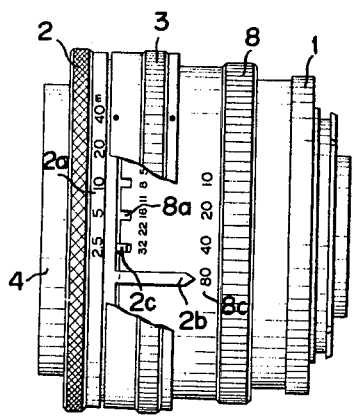
Figure 3:
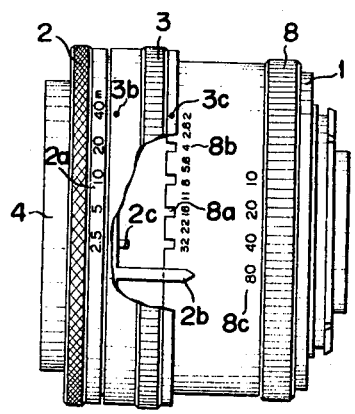

The present invention will now be described in detail referring to an illustrative embodiment shown in the drawing, in which:

FIG. 1 is a partial cross-sectional view of a lens mount embodying the invention; and FIGS. 2 and 3 are plan views, a portion thereof being in cross-section, FIG. 2 shows the clutch members engaged while in FIG. 3 the clutch members are disengaged.

A barrel 1 forming a part of the lens mount which may be mounted on a camera body (not shown) by a bayonet mounting, or the like, is provided with an axial slot 1a. A distance or focusing ring 2 is threaded on the front end of the barrel 1 and is provided with a distance scale 2a etched thereon, an indicator arm or pointer 2b and a projection or clutch tooth 2c. The internal periphery of the ring 2 is formed with cam groove 2d.

The distance scale 2a is associated with a stop value scale 8b and a flash guide number scale 8c provided on a stop ring 8, hereinafter more fully described, in such a manner that the product of the stop value and the distance value corresponds to a flash guide number value. An index ring 3 is fixed to barrel 1 and is provided on its inner face with an arcuate recess 3a to accommodate the pointer 2b and the clutch tooth 2c on the distance ring.

Index marks 3b and 3c are provided on the ring 3 to be read in conjunction with the scales 2a and 8b, respectively. A lens barrel 4 is provided in the lens mount, within which the lens elements and stop (not shown) are mounted, the barrel 4 having a projection 5 thereon to operate the stop means. An intermediate barrel 6 integral with the barrel 4 is formed with an opening 6a. A pin 7 secured to the barrel 6 extends into and cooperates with the internal cam groove 2d of the distance ring in the usual manner. The stop ring 8 is slidably and rotatably mounted on the barrel 1 and is formed with a clutch member in the form of notches 8a for engagement by the clutch tooth 2c on the distance ring. Etched or otherwise affixed to the stop ring 8 are the previously mentioned stop values 8b and flash guide numbers 8c. It will be noted in FIG. 2, that with the clutch members engaged, the stop ring 8 slides under the index ring 3 so that the stop scale values on the stop ring are covered by the index ring. The ring 8 is formed on its internal surface with an axially extending groove 8d which is interlocked by means of a connecting pin 9 which passes through the opening 6a, with the stop projection 5; the rotation of the stop ring 8 setting the lens stop (not shown) to its desired opening.

With the structure as explained above, when flash photography is desired according to a flash guide number value as indicated by the flash light source used, the stop ring 8 is moved forwardly while indicator arm 2b is aligned with a flash guide number 8c, the clutch members 2c and 8a are engaged so that the distance adjusting ring 2 and the stop ring 8 are interlocked. On the other hand, when the stop ring 8 is moved to the position shown in FIG. 3, the stop ring 8 is disengaged from the distance adjusting ring 2 so that both rings operate separately to permit the usual type photography. When a conventional click-stop means is provided for stopping ring 8 it is more convenient to determine the respective positions thereof.

As has been explained so far in the foregoing paragraphs, when the present invention is applied, the distance and the aperture can be automatically interlocked by a simple structure and operation when flash photography is done, and when an ordinary photography is desired, the stop ring and the distance adjusting ring can be separated and they can be used as the conventional stop ring and distance adjusting ring, respectively.

What is claimed is:

1. A lens mount for a camera, comprising
   a fixed barrel having means for attaching the lens mount to a camera body,
   a lens barrel including the lens system and stop means supported by the fixed barrel,
   a distance adjusting ring rotatably mounted on the fixed barrel, said distance ring having a distance scale thereon, a pointer, and a first clutch member;
   a stop adjusting ring rotatably and axially movable on the fixed barrel, said stop ring having a stop scale thereon, a flash guide number scale thereon, a second clutch member, and formed with an axially extending groove;
   a connecting pin slidably engaged in the axially extending groove of the stop ring and cooperating with the stop means of the lens barrel for adjusting the stop value, and
   an index ring integral with the fixed barrel and provided with indices for the distance and stop scales, the stop value being indicated by the index of the index ring read against the stop value scale when the two clutch members are disengaged, the flash guide number being indicated by the pointer on the distance ring when the clutch members are engaged by the axial movement of the stop ring, the stop value being adjusted in accordance with the rotation of the distance ring after clutch engagement.

2. A lens mount according to claim 1, wherein the index ring is radially spaced from the stop ring by an arcuate recess, the axial movement of the stop ring to engage the clutch members moving the stop scale on the ring under the index ring to cover the stop scale by the index ring.

References Cited

UNITED STATES PATENTS 3,203,331   8/1965   Hofmann _____ 95—64

NORTON ANSHER, Primary Examiner

RICHARD L. MOSES, Assistant Examiner

U.S. Cl. X.R.

95—64